United States Patent [19]
Nichols et al.

[11] Patent Number: 5,607,996
[45] Date of Patent: Mar. 4, 1997

[54] ELECTRORHEOLOGICAL ELASTOMERS USEFUL AS VARIABLE STIFFNESS ARTICLES

[75] Inventors: Mark E. Nichols, Saline; John M. Ginder, Plymouth; Larry D. Elie, Ypsilanti; Robert A. Pett, Franklin, all of Mich.

[73] Assignee: Ford Motor Company, Dearborn, Mich.

[21] Appl. No.: 318,395

[22] Filed: Oct. 5, 1994

[51] Int. Cl.$^6$ .................. C08F 3/08; C08F 3/22; H01B 1/02

[52] U.S. Cl. ............ 524/439; 524/430; 524/431; 524/432; 524/433; 524/408; 524/436; 524/444; 252/511; 252/512

[58] Field of Search .................. 524/436, 437, 524/439, 408, 420, 430, 431, 432, 444; 252/511, 512

[56] References Cited

U.S. PATENT DOCUMENTS

| | | | |
|---|---|---|---|
| 4,416,790 | 11/1983 | Schurmann et al. | 252/62 |
| 4,645,614 | 2/1987 | Goossens et al. | 252/75 |
| 4,668,417 | 5/1987 | Goossens et al. | 252/75 |
| 4,702,855 | 10/1987 | Goossens et al. | 252/75 |
| 4,879,056 | 11/1989 | Filisko et al. | 252/74 |
| 5,106,521 | 4/1992 | Kurachi et al. | 252/73 |
| 5,194,181 | 3/1993 | Reitz | 252/500 |
| 5,213,713 | 5/1993 | Reitz | 252/500 |
| 5,249,784 | 10/1993 | Murakami et al. | 267/219 |
| 5,290,821 | 3/1994 | Sakurai et al. | 524/430 |
| 5,354,488 | 10/1994 | Shtarkman et al. | 252/519 |
| 5,364,565 | 11/1994 | Li | 252/511 |
| 5,486,613 | 1/1996 | Broussard et al. | 546/181 |

FOREIGN PATENT DOCUMENTS

| | | |
|---|---|---|
| 0009890 | 1/1977 | Japan. |
| 0075705 | 5/1983 | Japan. |
| 2283140 | 12/1987 | Japan. |
| 4107334 | 4/1992 | Japan. |
| 4266970 | 9/1992 | Japan. |

OTHER PUBLICATIONS

Electroviscoelastic effect of polymeric composites consisting of polyelectrlyte particles and polymer gel, Journal of Materials Science 28 (1993) 1293–1299.

*Primary Examiner*—Tae Yoon
*Attorney, Agent, or Firm*—Lorraine S. Melotik

[57] ABSTRACT

This invention is directed to an ER elastomer composition comprising natural rubber and polarizable particles dispersed therein, which elastomer can undergo changes in Youngs modulus when subjected to an electric field and having a Youngs modulus of at least about 2 Mpa when not subject to an electric field, wherein the ratio of the electrical conductivity of the particles to the electrical conductivity of the natural rubber is between about $10^4$ and $10^{10}$. The invention also include variable stiffness mounts, such as engine mounts, made from the composition.

8 Claims, 2 Drawing Sheets

ELECTRORHEOLOGICAL ELASTOMERS USEFUL AS VARIABLE STIFFNESS ARTICLES

FIELD OF THE INVENTION

This invention is directed to a electrorheotogical elastomer composition of natural rubber and polarizable particles useful as variable stiffness articles like variable stiffness engine mounts.

BACKGROUND OF THE INVENTION

A variety of elastomeric mounts are used to attach components to an automobile, e.g., engine mounts, transmission mounts, and chassis mounts. Ideally, the mount must be rigid enough to support the weight of the component, but should be designed so that the vibrations from the powertrain, wheels, or other sources are minimally transmitted to the driver and passengers. These goals have led to a strategy whereby the mount itself is often designed to possess a mechanical resonance at a frequency below that of the component to be supported. Drawbacks of this approach include that a different mount must be designed for each mount location, that the mount cannot be re-tuned to accommodate options or accessories that alter the component's resonant frequencies, and that the mount cannot be adapted to the various vibrational resonances that are encountered under different operating conditions.

One approach that allows the adaptation to varying conditions is to introduce a variable element in the mount. An example is an engine mount possessing two fluid-filled chambers connected by an orifice. By mechanically varying the orifice size (e.g., by a valve driven by engine vacuum) one can vary the stiffness and damping of the mount. This is in fact the approach taken in one production engine mount.

Variable-stiffness mounts using electrorheological (ER) fluids use a simple variation on the above scheme. ER fluids are dense suspensions of small, polarizable particles in viscous, insulating liquids. When high electric fields are applied to these slurries, their apparent viscosities increase dramatically. Following the above approach, an ER mount can be constructed by filling two chambers with ER fluid and connecting them with an orifice. By applying a high electric field at the orifice, e.g., by using two parallel-plate electrodes, the flow of the ER fluid can be controlled and the stiffness of the mount can thereby be adjusted. Because the rheological response of most ER fluids to changes in applied field is fast, semi-active damping control is possible.

Several drawbacks are associated with the use of ER fluids. Since they are fluids, they must be sealed against leakage. Because the suspended particles generally have different density than the suspending liquid, the particles tend to eventually settle out of suspension due to gravity. One way to avoid these drawbacks is to suspend the polarizable particles not in a fluid, but rather in a viscoelastic solid. The stiffness of this ER solid can be varied by an applied voltage or electric field. These ER solids could be incorporated into a variety of elastomeric mount designs. It is conceivable that a single mount design would be utilized in any number of different applications simply by changing the operating voltage of the mount design to achieve different stiffnesses. Multiple benefits would presumably accrue from such a strategy: inventories could be reduced; new components could be accommodated with out redesigning the mount; accessories and options (e.g., air conditioning, turbochargers, etc. on an engine) that would affect the component resonance would not necessitate a mount redesign.

One ER solid is taught in U.S. Pat. No. 5,364,565 issued Nov. 15, 1994 to Li et al., and titled "Electro-viscoelastic Gel-Like Solids", which is commonly assigned with this invention. That material is a partially crosslinked solid made from liquid polymer precursors some of which are not as stiff as that of the present invention and hence, without the application of an electric field, not optimally useful as, e.g., engine mounts. Advantageously, the present invention elastomer has the necessary stiffness and durability to be used in manufacturing engine mounts and, because it comprises natural rubber as the host material, the elastomers could be easily mass-produced using production techniques well-established in the rubber industry.

DISCLOSURE OF THE INVENTION

This invention comprises an electrorheological elastomer composition comprising natural rubber and polarizable particles dispersed therein, the elastomer (a) having a Youngs modulus of at least about 2 MPa and (b) undergoing changes in the modulus when subjected to a changing electric field, wherein the ratio of the electrical conductivity of the particles to the electrical conductivity of the natural rubber is between about $10^4$ and $10^{10}$. According to another embodiment, the invention is also directed to articles made of this ER elastomer, such as engine mounts, transmission mounts, and shock absorber mounts.

DETAILED DESCRIPTION OF PREFERRED EMBODIMENTS

Figure 1A:
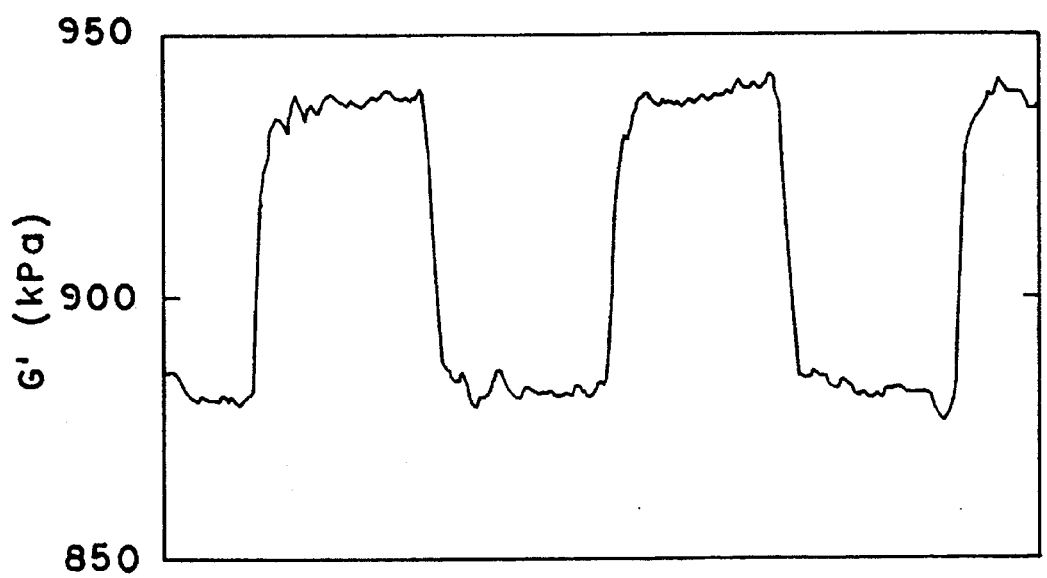
FIG. 1 illustrates plots of the time-dependent electric field E and the resulting shear storage modulus G' of an ER elastomer composition according to an embodiment of the invention.

The ER elastomer composition of the invention comprises natural rubber and polarizable particles dispersed therein. The elastomer has a Youngs modulus of at least about 2 MPa (when not subjected to an electric field). Preferably, for use as engine mounts and articles of that type, it has a Youngs Modulus of between about 6 and 18 MPa when not subjected to an electric field. As is known in the art, Youngs modulus and shear moduli are related by the equation $G=Y/(2(1+v))$ where G is the shear modulus, Y is the Youngs or longitudinal modulus, and v is the Poisson ratio. As elastomers are essentially incompressible, $v=½$ and so $G=Y/3$. The measurement of the shear modulus can thus be used to infer the value of the Youngs modulus, and vice versa.

As is known in the art, natural rubber is polyisoprene which can be either natural or synthetic. Generally, such natural rubber is compounded by mixing and curing ingredients like polyisoprene, fillers like carbon black, and a curative for the rubber such as sulfur. Natural rubber compositions are well known in the art and hence will not be discussed in detail here. No criticality is associated with the rubber formulation, except for restrictions on its conductivity as disclosed above. In fact, one of the advantages of the present invention is that because it is based on natural rubber, compounding of the ER elastomer composition can be done by conventional techniques widely known to those in the art. Generally, according to such processes, the natural rubber and the other components, including the curing agent such as sulfur, are added together and processed using ball or roll milling techniques to form and cure the rubber.

During compounding of the natural rubber, the polarizable particles are added into the formulation being compounded and substantially uniformly dispersed within the final ER elastomer composition. Preferably, the particles are added in near the beginning of the compounding process so as to be fully incorporated before curatives are added. To obtain the advantageous ER properties of the composition, it has been found that a large mismatch between the conductivities of the particulate and the natural rubber is desirable to promote large field-induced modulus increases. According to the invention, the ratio of the electrical conductivity of the particles to the electrical conductivity of the (cure) natural rubber (without the particles) is between about $10^4$ and $10^{10}$. As is known to those in the art, the electrical conductivity of some common natural rubbers is generally about $5 \times 10^{-14}$/ohm-m, although this invention ER elastomer composition is not meant to be so limited. Preferably, the particles have a direct current electrical conductivity of at least about $10^{-10}$/ohm-m. Examples of types of polarizable particles suitable for use in the present ER elastomer composition include, but are not limited to, those selected from the group consisting of inorganic, semiconductor materials; metal oxide compounds; aluminosilicates; semiconducting organic polymers; carbon black; and intercalated graphites. Inorganic semiconductor materials include materials like silicon, germanium, gallium arsenide, and group II–IV compound semiconductor materials like ZnS, ZnSe, CdS, CdSe, CdTe, and HgCdTe. Metal oxide compounds which may be employed include, e.g., iron oxides, copper oxides, titanium dioxide, tin dioxide, tungsten oxides, strontium titanates, barium titanates, and zirconium titanate to name a few. Examples of semiconducting organic polymers useful as the polarizable particles are poly(anilines), poly(thiophenes), poly(p-phenylene), poly(p-phenylene vinylene), and poly(acetylene). The polymers may be undoped or doped with donor or acceptor dopants such as Na, Ca, $FeCl_3$, $AsF_5$, and I.

Preferably, the amount of polarizable particulate included within the composition is that which provides a substantial ER effect, generally being at least about 30 wt. %, based on the total weight of the elastomer composition. For example, when formulating variable stiffness engine mounts from the invention ER elastomer composition, one optimal composition comprised silicon particles present in the elastomer in a weight ratio between about 0.5–3.5: 1 based on the total weight of the natural rubber (i.e., the total components used to make the host natural rubber for the particles). Optimally, the particles are present in a particle size of less than about 100 microns, generally being between 1 and 50 microns in order that they be readily producible from conventional milling or other processes and that they be readily processed into the elastomeric component.

An example of an embodiment of the ER elastomer composition was made from the following components:

| Natural rubber SMR-L | 100 | phr (parts/hundred rubber by weight) |
|---|---|---|
| ZnO | 5 | |
| Stearic Acid | 2 | |

-continued

| Agerite Resin D | 2 |
|---|---|
| Sundex 790 aromatic oil | 5 |
| Si powder | 110 |
| CBS | 0.5 |
| Sulfur | 2.5 |

Figure 1B:
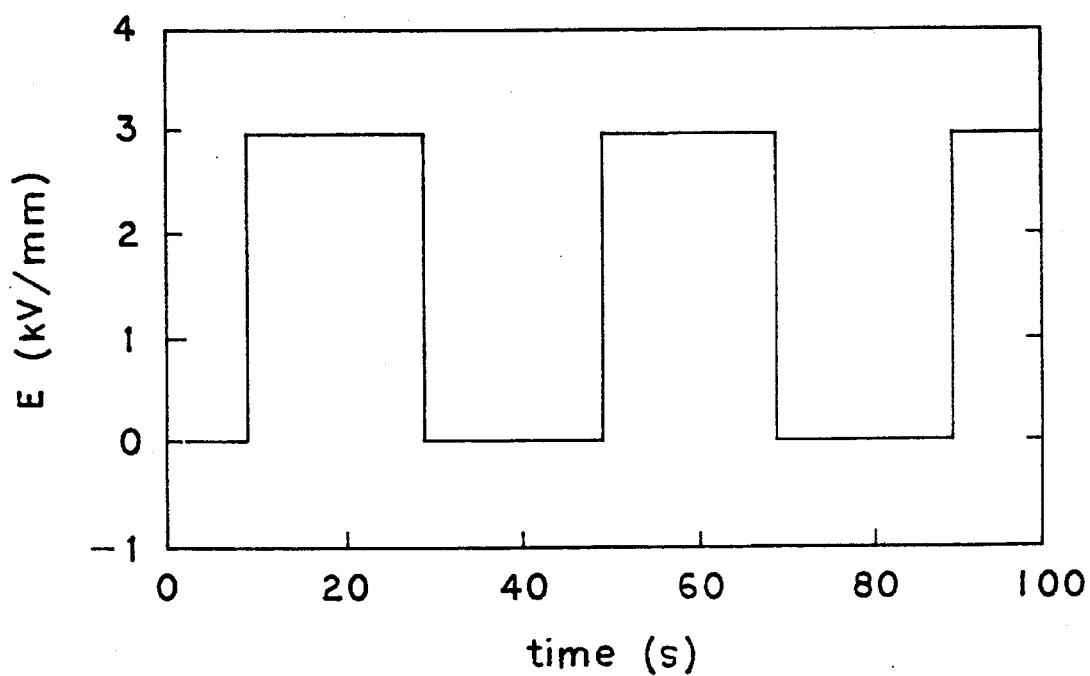

These ingredients were mixed in a two roll mill and cured in a hot press to produce the ER elastomer composition. The cured composition displayed an increase in storage modulus G' when placed in an electric field. The modulus was measured by placing a 2 mm thick discs of the composition between the conducting parallel discs of a rheometer. The bottom disc was driven with a 2 Hz sine wave oscillatory angular motion (peak amplitude 0.01), and the torque transmitted to the top disc was measured by a strain gauge torque sensor. The sample was electrified by applying high voltage to the discs. The response of the ER 40 composition to the application and removal of an electric field is shown in FIG. 1. It is seen that a 3 kV/mm applied field results in approximaterly a 60 kPa increase in G', which is about a 7% increase in shear storage modulus G' (which occurred within the response time of the rheometer used).

Figure 2A:
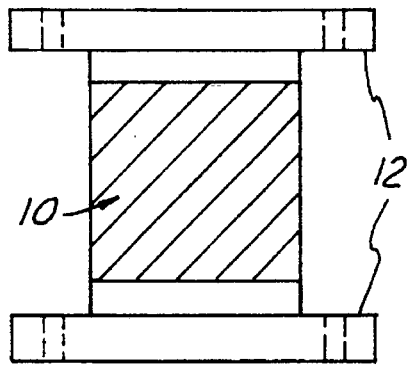
FIG. 2A, 2B, 2C, and 2D are schematics of embodiments of the present invention variable stiffness mount designs incorporating ER elastomer composition according to the present invention.
Figure 2B:
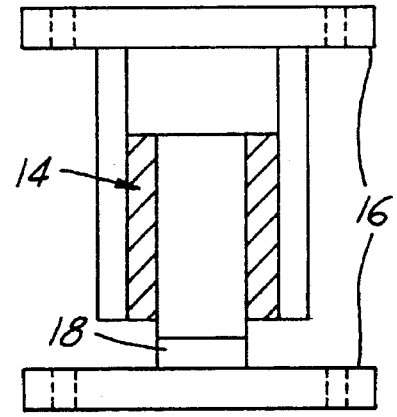

In order to make variable stiffness articles, e.g., engine mounts, from the invention ER elastomer composition, various designs are possible as shown in FIGS. 2A, 2B, 2C, and 2D. For example, flanges 12 in FIG. 2A which connect the mount to the component to be mounted and its host, e.g., to the engine and the chassis for an engine mount would be provided. The ER composition 10 of FIG. 2A can then couple the flanges together in a slab or a coaxial geometry, that of FIG. 2A being slab geometry. In FIG. 2B, coaxial geometry is shown with flanges 16 and ER composition 14, and an insulator 18. Assuming that the ER composition whose field-dependent moduli range from about 880 to 940 kPa as in FIG. 1 is used in a simple slab configuration (FIG. 2a) with a thickness of 1 cm and a cross-sectional diameter of 6.6 cm, the resulting shear stiffness would range from about 300 N/mm to 320 N/mm for applied fields between 0 and 3.0 kV/mm. Similar changes in longitudinal stiffness are expected.

Figure 2C:
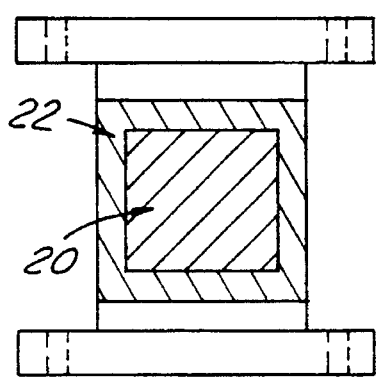
Figure 2D:
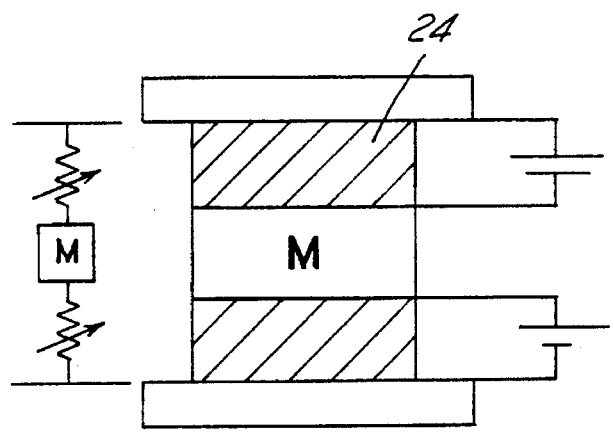

The ER composition can comprise the entire elastomeric portion of the mount as in FIGS. 2A and 2B, or it can be enclosed in a body made of elastomeric or other materials, as in FIGS. 2C and 2D, respectively. In FIG. 2C an elastomeric housing 22 encloses ER elastomer composition 20. In the FIG. 2D configuration, the elastomeric body can be thought of as a spring of fixed spring rate in series and/or parallel to that which is variable through the ER elastomer composition 24. The body geometry and choice of materials thus constitutes another set of design variables. Masses (M) can be added to the mount structure, shown in FIG. 2D, as is done in conventional mounts to induce the appearance of a resonance at a particular target frequency.

Some means of applying high field to the ER composition is required in order to change its stiffness. Electrodes can be constructed from metal sheet, from conducting polymer sheens, or from conducting elastomers. The electrodes can be embedded in the elastomer/particle mixture prior to curing, or can be attached externally after curing. Using embedded elastomers allows the application of a field during the cure process, which can lead to a chain-like orientation of the particles embedded in the elastomer and to changes in the post-cure performance of the ER composition. If no field is applied during the cure, a random distribution of particles likely results. Field-induced changes in the composition rheology are observed in both cases. Special electrode geometries can allow the construction of mounts with novel properties, e.g., mounts with independently controlled stiffness in two directions. In most instances, the "hot" electrodes should be isolated by a layer of elastomer or other insulation from contact with other metal surfaces and from human contact.

For each independently controllable ER composition mount, a separate high voltage power supply is likely required. The maximum voltage necessary depends in large part on the electrode separation, since fields of the order of several kV/mm are generally required to effect substantial changes in stiffness. The electrical power required should be a few watts at most, since the only current draw is due to leakage in the ER composition. Control circuitry for adjusting the applied voltage on a passive or semiactive basis may be required for some applications.

We claim:

1. An electrorheological elastomer composition comprising natural rubber and polarizable particles dispersed therein in a weight ratio of 1:0.5–3.5 of natural rubber:particles, said elastomer (a) having a Youngs modulus of at least about 2 MPa and (b) undergoing changes in said modulus when subjected to a changing electric field, wherein the ratio of the electrical conductivity of said particles to the electrical conductivity of said natural rubber is between about $10^4$ and $10^{10}$, said particles consisting of inorganic semiconductor materials selected from the group consisting of aluminosilicate, silicon, germanium, gallium arsenide, group II–IV compound semiconductor materials and metal oxide compounds.

2. The elastomer according to claim 1 wherein said particles have a direct current electrical conductivity of at least about $10^{-10}$/ohm-m.

3. The elastomer according to claim 2 wherein said metal oxide compounds are selected from the group consisting of iron oxides, copper oxides, titanium dioxide, tin dioxide, tungsten oxides, strontium titanates, barium titanates, and zirconium titanate.

4. An article comprising an eletrorheological elastomer composition comprising natural rubber and polarizable particle dispersed therein in a weight ratio of 1:0.5–3.5 of natural rubber:particles, said elastomer (a) having a Youngs modulus of at least about 2 MPa and (b) undergoing changes in said modulus when subjected to a changing electric field, wherein the ratio of the eletrical conductivity of said particles to the electrical conductivity of said natural rubber is between about $10^4$ and $10^{10}$, said particles consisting of inorganic semiconductor materials selected from the group consisting of aluminosilicate, silicon, germanium, gallium arsenide, group II–IV compound semiconductor materials and metal oxide compounds.

5. The article according to claim 4 wherein said article is selected from the group consisting of engine mounts, transmission mounts, shock absorber mounts, suspension bushings, and seals.

6. The article according to claim 4 wherein said particles have a direct current electrical conductivity of at least about $10^{-10}$/ohm-m.

7. The article according to claim 6 wherein said metal oxide compounds are selected from the group consisting of iron oxides, copper oxides, titanium dioxide, tin dioxide, tungsten oxides, strontium titanates, barium titanates, and zirconium titanate.

8. An engine mount comprising an electrorheological elastomer composition comprising natural rubber and silicon particles dispersed therein, said elastomer (a) having a Youngs modulus of at least about 2 Mpa and (b) undergoing changes in said modulus when subjected to a changing electric field, wherein the ratio of the electrical conductivity of said particles to the electrical conductivity of said natural rubber is between about $10^4$ and $10^{10}$, said silicon being present in said elastomer in a weight ratio between about 0.5–3.5:1 based on the weight of said natural rubber.

* * * * *